Jan. 13, 1953     K. J. PERSAK     2,624,916
GLOSSY MOLDING PROCESS FOR ETHYLENE POLYMERS
Filed Feb. 19, 1951
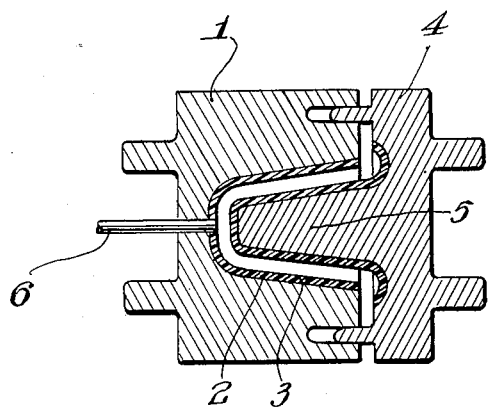
INVENTOR
*Kenneth John Persak*
BY
ATTORNEY Patented Jan. 13, 1953

2,624,916

UNITED STATES PATENT OFFICE 2,624,916

GLOSSY MOLDING PROCESS FOR ETHYLENE POLYMERS

Kenneth John Persak, Hackensack, N. J., assignor to E. I. du Pont de Nemours and Company, Wilmington, Del., a corporation of Delaware Application February 19, 1951, Serial No. 211,807

2 Claims. (Cl. 18—55)

1

This invention relates to molding solid ethylene polymer into articles having a glossy surface and more particularly to certain resinous coatings applied to the mold surface for producing glossy articles of ethylene polymer.

Since the advent of commercial ethylene polymer molding, the use of this plastic has been restricted by a lack of surface gloss on the molded articles. The normally solid ethylene polymers for use in this invention, and which are described by Fawcett in U. S. Patent 2,153,553, may be injection molded in standard highly polished metal molds without adhesion to the inner surface of the mold, but this process produces a characteristic dull or frosty finish on the surface of the molded article. This is peculiar to this group of polymers since polyamide resins and other resins when properly injection molded in polished metal molds, retain the polish of the metal mold surface. The gloss of injection molded ethylene polymer articles may be improved, to a limited extent, by using very high polymer temperatures and/or very high die temperatures, but only at the expense of considerably longer molding cycles which are uneconomical on a commercial scale.

An object of this invention is to provide an improved method of molding solid ethylene polymers to obtain glossy molded articles without increasing the normal molding cycle time for either simple or intricate mold designs. A more specific object is to provide a method whereby ethylene polymers injected into a metal mold will reproduce the finish of the mold without extending the normal molding cycles for these polymers. Other objects will be apparent from the description of the invention given below.

The above objects are accomplished by accurate control of the molding temperature of the solid polymer of ethylene during the actual molding operation. When the fluid polymer starts to solidify in the mold, the part of the fluid polymer in contact with the relatively cool mold solidifies first and the solidification progresses from the solidified portion into the unsolidified portion of the polymer. If this cooling is in progress and the polymer is in motion with respect to the die surface, there is a tendency of the polymer surface to take on a finish other than that of the adjacent surface of the mold. The invention is based on the discovery that if an insulating layer is interposed between the metallic mold and the molten polymer, the temperature gradient within the solidifying polymer will be decreased and as a consequence, motion of the polymer with respect to the die surface has ceased before the polymer

2 adjacent to the die surface has solidified. By providing an insulating layer accordingly, having the proper thermoconductivity and a highly polished surface, a molded product can be obtained from the solid polymers of ethylene that has surfaces with substantially the identical gloss of the polished surface of the insulation.

A metal mold is preferably used, the surface of which carries a coating of at least 0.5 mil thickness, and preferably between 2 and 3 mil thickness, of a resin, capable of being converted upon heating to a continuous adherent glossy coating insoluble in the molten ethylene polymer being molded, resistant to the molding temperature of the ethylene polymer and having a coefficient of thermal conductivity, $k$, below 6 B. t. u./sq. ft./hr./°F./in. and preferably between 1.0 and 2.5 B. t. u./sq. ft./hr./°F./in. The preferred resins used for coating are the heat-convertible thermosetting resins, such as urea-formaldehyde resins, which have been cured in situ on the mold surface.

The glossy articles of ethylene polymer are obtained by first fabricating a standard metal mold and surrounding the cavity with a low conductivity resin such as that described infra. The ethylene polymer molding powder is then fed to the mold in melted form and molded under conventional conditions. Although the ethylene polymer may be molded at any temperature between the melting point of the polymer but below its decomposition point, it is normal in commercial practice to operate with die temperatures as low as possible in the range of 70° F.–120° F. and ethylene polymer temperatures of 275° F.–450° F. under suitable pressure.

The invention is illustrated by the drawing. The single figure is a cross-sectional elevation of a mold in which the process of the invention can be conducted. The mold is of a standard metal mold type for use in any common type of injection molding apparatus. Inasmuch as the invention is concerned with the mold itself and not with the apparatus in which the molding operation is conducted, only the mold is shown. Part 1 or nowel of the mold contains a cavity 2 which may be of any desired shape, the cavity being provided with an inner surface 3 of a vegetable oil modified alkyd resin such as that described in Example 1. Part 4 or cope of the mold is provided with a mating member 5. When the cope 4 and nowel 1 are in an operating position a cavity is provided between them into which the polymer is injected through the sprue 6. The drawing shows the cope 4 and nowel 1 almost in position for injection of the molten polymer. On the outside surface of member 5 there is also provided a vegetable oil modified alkyd resin or similar plastic surface. In operation the nowel 1 and cope 4 are placed in juxtaposition; molten resin is forced through sprue 6 into the cavity between the mold parts; the molten resin is then cooled until solid; thereafter the nowel 1 and cope 4 are separated and the finished article removed from the mold. Molded articles of the normally solid polymers of ethylene produced in this manner have glossy surfaces superior to those obtainable from the normally solid polymers of ethylene by the use of uncoated molds.

Although the invention is especially directed to and offers the most advantages when preparing injection molded glossy articles of ethylene polymer, the process may likewise be employed for transfer molding, extrusion molding, blow molding and compression molding of ethylene polymer. Compression molding in a polished metal die, however, generally imparts a relatively glossy surface to ethylene polymers without the use of a special resinous coating as described in this invention.

The thermal conductivity of the resinous coating employed is one of the most critical factors in achieving molded articles having a glossy surface. All thermal conductivities mentioned in this specification and appended claims are understood to be in units of B. t. u./sq. ft./hr./°F./in. of thickness. In general, the thermal conductivity of the resinous coating may be any value below 6, and the lower the conductivity, for a given thickness of resin coating, the higher is the gloss of the molded ethylene polymer article. The gloss of the molded article decreases sharply when employing a resin having a conductivity above 6 for a given thickness and hence such resins are of minor utility in the present process.

In addition to thermal conductivity requirements, the coated resin must also be resistant to the molding temperatures used with ethylene polymers. By this is meant that when the molding powder is subjected to the normal molding temperatures the resinous coating on the mold must not decompose or melt, but most important of all must not lose its glossy finish, for otherwise high glossy ethylene polymer articles will not be obtained. For example, most thermoplastic resins (e. g. polyvinyl chloride, polystyrene) when used as mold coatings are not sufficiently heat-resistant to give ethylene polymer moldings of high gloss for they soften and lose their glossy surface at the molding temperature. All resins, therefore, having a suitable thermal conductivity below 6 are not necessarily suitable unless they retain their gloss at the molding temperatures of ethylene polymer. The preferred group of resins for use as the mold coatings are the heat-convertible thermosetting resins which are cured by conventional means on the mold surface before making ethylene polymer moldings. Examples of this preferred group of resins include urea-formaldehyde resins, phenol-formaldehyde resins, resorcinol-formaldehyde resins, melamine-formaldehyde resins, polybasic acid/polyhydric alcohol resins (alkyds), and combinations of these resins. These resins, before complete curing, are generally applied to the mold surface from a solution in a suitable solvent which is removed by heating during the curing operation. Polytetrafluoroethylene and polytrifluorochloroethylene are further examples of resins satisfactory as the coating in that they may be applied as a fluid dispersion in water or in an organic liquid and then baked on the surface by sufficient heating to give a smooth, hard adherent coating on the mold.

The method of preparing the resin coated metal mold involves applying a relatively thin coating of a resin of suitably low conductivity to the mold surface or those portions of the mold which are to impart a glossy finish to the molded ethylene polymer article. The coating may be applied by spraying, dipping or other known techniques.

If the mold is to be sprayed it should first be solvent dipped or vapor degreased to insure maximum adhesion. Since the smoothness of the molded finish depends upon the quality of the applied coating, the spraying should be done in a dust-free location. If dipping is to be used to apply the coating, care should be taken to avoid tearing. The preferred resins for applying a coating on the mold surface are the heat-convertible thermosetting resins which are employed in a partially condensed fusible state; that is, they are condensation products which are not fully cured and are in liquid or viscous forms suitable for spraying or dipping with or without added solvents. After the liquid resin or resinous solution has been applied to the mold surface, the solvent present, if any, is removed by conventional means and the coating is then cured by heating at an elevated temperature for a sufficient time to obtain a hard adherent coating which is fully condensed and infusible.

The following examples illustrate specific embodiments of this invention, all parts being by weight unless otherwise specified.

Example 1.—A partially condensed, heat-convertible vegetable oil modified alkyd resin in a hydrocarbon solution of a monohydric alcohol modified urea-formaldehyde resin was applied to 2-inch diameter steel discs. An air brush was used to spray the discs with two layers of resin, each layer being air oven baked for two hours at 200° F. to cure the resin. These discs were used as inserts in a 2-inch diameter by ¼ inch thick circular chip mold. The resin had a thermal conductivity of 1.5, which is 1/300 that of the steel in the mold. The dry resin coating was two mils thick. The mold was filled with a melted commercially available solid ethylene polymer molding powder, and the ethylene polymer was injection molded at a polymer temperature of 400° F., a die temperature of 70° F., a pressure of 12,000 p. s. i. and an overall 30 second cycle. After the molded ethylene polymer chip was cooled and removed from the mold, it was observed that the surface had a uniform high gloss.

The same chip mold as described above was used with disc inserts having a one mil coating of the above alkyd modified urea-formaldehyde resin. The molding cycle was the same, but the surface of the resulting molded ethylene polymer chip did not have as high a gloss as the above sample. However, using the 1 mil coating there was definite improvement of the gloss over the ethylene polymer chips molded under the same conditions using inserts having no resin coating, the latter having the characteristic frosty dull surface.

Example 2.—The same alkyd modified urea-formaldehyde resin as described in Example 1 was applied in three layers in the same manner to coat the female portion of a tumbler mold made of steel. Each of the first two layers was air oven baked at 200° F. for two hours, and the third resin layer at 200° F. for 16 hours. The final resin coating was approximately 4.5 mils thick. Ethylene polymer molding powder was fed to the mold in molten form and injection molded under 16,000 p. s. i. pressure at 400° F. polymer temperature and 70° F. die temperature with an overall 30 second cycle. The resulting molded ethylene polymer tumbler has a superior high gloss over the whole outside of the tumbler, but the typical frosty surface on the inside because the male inserts of the mold were not coated with resin.

The mold may be made of any metal generally used for molding plastics, such as steel, beryllium-copper alloy, and the like, either plated or unplated.

A further critical factor of the invention is the thickness of the resinous coating applied to the mold. It is preferred to employ the thinnest possible resinous coatings. Satisfactory glossy moldings have been produced with a resin coating of 0.5 mil. At thicknesses less than 0.5 mil the heat transfer rate is not sufficiently decreased to impart a glossy surface to the ethylene polymer molding, even with the lowest conductivity resins available. The exact thickness of the resinous coating will depend upon the thermal conductivity of the resin used for coating, the lower the conductivity, the thinner the coating possible. The coating may vary from 0.5 mil up to 5 mils thick and sometimes higher, the upper thickness being limited by the ethylene polymer molding cycle. In commercial practice the optimum thickness of resinous coating will be in the range of 2–3 mils, and will possibly not exceed 15 mils because of the prolonged molding cycle time.

Another feature of this invention may be realized by coating only part of the surface of the mold and/or insert, or a part of each side of the mold to produce windows of increased transparency in the finished molded ethylene polymer article. Thus for one particular application injection molded bottles may be made of solid ethylene polymer having integrally molded on one side thereof suitable letters, trade-marks, or descriptive or design material by masking the desired portion or portions of the mold before application of the resinous coating. This procedure results in the normal frosty surface of ethylene polymer where the mold surfaces are masked and a highly glossy surface of improved transparency in areas which contact the resin coated portions of the mold.

The chief advantages of this invention are the realization of higher gloss factors on the surface of injection molded ethylene polymer articles, especially those of intricate design and shape, without increasing the molding time cycles, as well as improved transparency of the resulting ethylene polymer moldings. Thousands of glossy moldings may be made in a single resin coated mold without any surface dulling.

This invention may be used to produce a wide variety of articles molded of solid ethylene polymer, such as bottle caps, electrical parts, bottles, buttons, tumblers, plates and other household utensils, toys and novelty items. The ethylene polymer molding powder may have incorporated therein, prior to being charged to the mold, small amounts of conventional additives, such as, for example, heat and light stabilizers, pigments, anti-static agents and the like.

I claim:

1. In a process for the molding of solid polymers of ethylene to glossy surfaced articles, the steps which comprise charging a normally solid polymer of ethylene from a molten state and at a temperature between 275° F. and 450° F. into a metal mold of the desired shape, in which the metal of the mold is separated from the ethylene polymer by a layer of insulation firmly bound to the metal of the mold of a heat-converted thermoset resin of the group consisting of urea-formaldehyde resins, phenol-formaldehyde resins, resorcinol-formaldehyde resins, melamine-formaldehyde resins, polybasic acid/polyhydric alcohol resins and combinations thereof, molding the polymer of ethylene at a temperature between the melting point of the polymer and below its decomposition point, solidifying the polymer in the mold at a temperature below the melting point of the polymer while in contact with the insulating layer, the insulating layer being from 0.5 to 5 mils in thickness and having a surface in contact with polymer of ethylene that carries a high polish.

2. In a process of molding in a closed mold solid polymers of ethylene to articles having glossy surfaces, the steps which comprise injecting a solid polymer of ethylene while in a molten state, at a temperature between 275° F. and 450° F., into a metal mold in which the metal of the mold is separated from the ethylene polymer by a layer of a partially condensed, heat-convertible vegetable oil modified alkyd resin film integral with the metal of the mold, the resin film having been applied to the metal mold by spraying said resin on the surface of the mold and baking at a temperature of about 200° F., molding the polymer of ethylene to the shape of the mold by the application of pressure cooling the solid polymer of ethylene and thereafter separating the article from the mold.

KENNETH J. PERSAK.

REFERENCES CITED

The following references are of record in the file of this patent:

UNITED STATES PATENTS

| Number | Name | Date |
| --- | --- | --- |
| 2,232,475 | Renfrou et al. | Feb. 18, 1941 |
| 2,485,238 | Hickok | Oct. 18, 1949 |